(12) United States Patent
Parantainen et al.

(10) Patent No.: US 7,636,337 B2
(45) Date of Patent: Dec. 22, 2009

(54) TRANSMISSION OF DATA FOR MULTIMEDIA BROADCAST/MULTICAST SERVICES

(75) Inventors: Janne Parantainen, Helsinki (FI); Arto Leppisaari, Kangasala (FI); Harri Jokinen, Hiisi (FI)

(73) Assignee: Nokia Corporation, Espoo (FI)

( * ) Notice: Subject to any disclaimer, the term of this patent is extended or adjusted under 35 U.S.C. 154(b) by 1033 days.

(21) Appl. No.: 10/157,430

(22) Filed: May 28, 2002

(65) Prior Publication Data

US 2003/0223394 A1     Dec. 4, 2003

(51) Int. Cl.
    *H04J 3/00*     (2006.01)
(52) U.S. Cl. .................. 370/336; 370/329; 370/342; 370/347
(58) Field of Classification Search .................. None
    See application file for complete search history.

(56) References Cited

U.S. PATENT DOCUMENTS

| | | | | |
|---|---|---|---|---|
| 6,330,700 | B1 * | 12/2001 | Morris et al. ................ | 714/752 |
| 6,456,627 | B1 * | 9/2002 | Frodigh et al. .............. | 370/465 |
| 6,504,832 | B1 * | 1/2003 | Koo et al. ................... | 370/342 |
| 6,804,528 | B1 * | 10/2004 | Laroia et al. ................. | 455/503 |
| 6,879,573 | B1 * | 4/2005 | Huo ........................... | 370/337 |
| 6,944,146 | B1 * | 9/2005 | Barany et al. ................ | 370/338 |
| 2002/0160781 | A1 * | 10/2002 | Bark et al. ................... | 455/450 |
| 2003/0114177 | A1 * | 6/2003 | Sinnarajah et al. .......... | 455/515 |
| 2003/0207696 | A1 * | 11/2003 | Willenegger et al. ........ | 455/522 |

FOREIGN PATENT DOCUMENTS

| | | |
|---|---|---|
| WO | WO 96/41493 | 12/1996 |
| WO | WO 01/76283 A1 | 10/2001 |

OTHER PUBLICATIONS

3GPP TS 22.146 V5.0.0 (Oct. 2001) Multimedia Broadcast/Multicast Service; Stage 1 (Release 5).
Search Report No. PCT/IB 03/02219 dated Sep. 12, 2003.
3 GPP TS 22.146 V5.2.0 (Mar. 2002) "Multimedia Broadcast/Multicast Service"; Stage 1 (Release 5).
Nokia, On MBMS RAN Requirements, 3GPP, May 13, 2002. 3GPP TSG-RAN WG2 Meeting #29 R2-021197, p. 1-2.
Notice of Reasons for Rejection, JP Application No. 2004-507282, mailed Aug. 5, 2008.

* cited by examiner

*Primary Examiner*—Jayanti K Patel
*Assistant Examiner*—Anthony Sol
(74) *Attorney, Agent, or Firm*—Perman & Green LLP

(57) ABSTRACT

The invention relates to a method for transmitting data for a multimedia broadcast/multicast service (MBMS) from a radio access network of a cellular communication network via a radio interface to mobile terminals located in a radio cell supplied by said radio access network. The radio access network transmits paging messages on a common control channel. It is proposed that a dedicated channel is employed for transmitting the MBMS data, which dedicated channel is allocated in a way that the mobile terminals are able to receive simultaneously paging messages and the MBMS data. The invention relates equally to a corresponding network entity, mobile terminal and communication system.

41 Claims, 6 Drawing Sheets

52 multiframe

| PBCCH | PCCCH | PMBCH | x | PBCCH | PCCCH | PMBCH | x | PBCCH | PCCCH | PMBCH | x | PBCCH | PCCCH | PMBCH | x | x=idle frame

TRANSMISSION OF DATA FOR MULTIMEDIA BROADCAST/MULTICAST SERVICES

FIELD OF THE INVENTION

The invention relates to a method for transmitting data for a multimedia broadcast/multicast service (MBMS) from a radio access network of a cellular communication network via a radio interface to mobile terminals located in a radio cell supplied by the radio access network. The employed radio access network can be in particular a GERAN, i.e. a GSM (Global System for Mobile Communications) EDGE (Enhanced Data-rates for GSM) RAN (Radio Access Network). The invention relates equally to a corresponding network entity, to a corresponding mobile terminal, and to a corresponding communication system.

BACKGROUND OF THE INVENTION

The first stage of the technical specification 3GPP TS 22.146 V5.0.0 (2001-10): "Multimedia Broadcast/Multicast Service; Stage 1 (Release 5)" specifies requirements for a service called Multicast Broadcast Multimedia Service (MBMS). The MBMS is to enable point-to-multipoint transmissions of multimedia data, like text, audio, picture, or video. For the MBMS, two modes of operation are provided, the broadcast mode and the multicast mode. Unlike the broadcast mode, the multicast mode generally requires a subscription to a multicast subscription group and an activation of the service. In broadcast mode, the multimedia data is transmitted from a single source point via a radio interface to a broadcast area, while in multicast mode, the multimedia data is transmitted from a single source point via a radio interface to a multicast group in a multicast area. In both modes, a plurality of mobile terminals may thus receive the same data over a common radio channel, which enables an efficient use of radio resources. The realization of the MBMS over the radio access network has not been specified yet For MBMS data that is to be transmitted in a radio cell of a cellular communication network, a transport mechanism is required, which takes into account the general capacity allocation in this radio cell.

Transmissions to and from GERAN are based on time division multiple access (TDMA). In a TDMA system, the time on the radio interface is divided in to frames, and each frame is further divided into several time slots. In the case of GSM/GPRS (General Packet Radio Service), there are 8 time slots per frame, as indicated in FIG. 1.

For the transmission of data via the radio interface, a physical channel is defined as a sequence of frames on a time slot and frequency. For illustration, FIG. 2 shows for a single radio frequency carrier the sequence of time slots 21 for 8 consecutive TDMA frames arranged on a helix such that the same time slot in the different frames appears at the same angular location on the helix. A physical channel using only this carrier is composed by a sequence of the respectively same time slot 22 in these frames. The time slot 22 in each TDMA frame belonging to the represented physical channel is pointed out in the figure by shading. The physical content of a time slot, i.e. the corresponding period of the radio frequency carrier which is modulated by a data stream, is referred to as burst.

In GPRS and EGPRS (Enhanced GPRS), a physical channel is further divided into blocks of four consecutive frames, which is equally indicated in FIG. 2. Data can be transferred with this structure in four block-interleaved bursts, while there is one burst per time slot and per frame. The blocks can carry a varying amount of information, depending on the modulation and coding scheme used. Information from several logical channels, e.g. Packet Data Channel (PDCH), Packet Common Control Channel (PCCCH), Packet Associated Control Channel (PACCH), etc. can be multiplexed into the different blocks of one physical channel. Thus, a first block can be associated to a PDCH, the next block to a PCCCE, and so on. It is also possible to multiplex several users into a single PDCH.

In order to support a specific data rate for a specific service, the network is further able to allocate for a service several physical channels in parallel and all or part of the radio blocks of these physical channels. This way, the network can provide required bit rates in a flexible manner.

The physical channels must be located in the frequency and time domain in a way that reception and transmission by the mobile terminals in the cell is enabled. In case the mobile terminals in the cell are to follow several channels at the same time, multislot class constraints of the mobile terminals have moreover to be taken into account. A mobile terminal can receive and transmit on a predetermined number of time slots, which number depends on the capabilities of the mobile terminal. The number of time slots that are supported for transmission and reception determine the multislot class of the mobile terminal. Typically, a mobile terminal is able to support e.g. 2, 3 or 4 time slots in the downlink and 1 or 2 time slots in the uplink. In the simplest case, the mobile terminal is a 1+1 terminal, which can receive and transmit on only one time slot per direction. The uplink transmission periods and the downlink reception periods allocated to a terminal must be set in such a way that they leave sufficient time in between, in order to enable the mobile terminal to change from reception to transmission and vice versa, to change the frequency, and to carry out neighbor cell measurements. An exemplary allocation taking into account these requirements is illustrated in FIG. 3.

FIG. 3 shows in a first row 19 downlink time slots and in a second row 19 uplink time slots of consecutive TDMA frames. The time slots used by a multislot class 4 mobile terminal in the downlink and in the uplink are pointed out in FIG. 3 by shading. As can be seen, the mobile terminal is capable of receiving on 3 consecutive time slots 3-5 in the downlink and of transmitting on one time slot 4 in the uplink. Due to the offset in the time slot numbering in the downlink and in the uplink, there is always a spare time of at least one time slot for changing from reception to transmission and vice versa.

A PDCH is a physical channel allocated to carry packet logical channels. In an idle mode, a mobile terminal is prepared to transfer packet data units (PDU) on PDCHs, but no radio resources on a PDCH are allocated for the mobile terminal. During the idle mode, the terminal has to be able, however, to follow a packet broadcast control channel (PBCCH) and its paging group on the PCCCH.

A broadcast control channel is a point-to-multipoint unidirectional control channel from the fixed sub-system to the mobile terminals. The PBCCH constitutes one of these broadcast control channels and broadcasts parameters used by the mobile terminals to access the network for packet transmission operation. The PBCCH is mapped onto one PDCH only, and thus only on one time slot. One of a plurality of parameters contained in the PBCCH is the parameter BS_PBCCH_BLKS, which indicates the number of blocks allocated to the PBCCH in a TDMA multiframe.

The PCCCH is one of several common control channels constituting a point-to-multipoint bi-directional control channel. The PCCCH and its different logical channels, i.e. the Packet Paging Channel (PPCH), the Packet Notification Channel (PNCH), the Packet Random Access Channel (PRACH) and the Packet Access Grant Channel (PAGCH), can be mapped dynamically to physical channels. Except for the PPCH and the PRACH, the PCCCH can be mapped on all blocks except for those used for the PBCCH. A terminal registered to a network is allocated to a specific paging group, and paging messages are transmitted by the PPCH associated to the respective paging group. A paging message comprises data which is required when the network wants to initiate a communication with the terminal.

If there is only one PCCCH in the cell, it is on the same time slot as the PBCCH. If there is a need for additional PCCCHs, these can be assigned to other time slots and/or to other carriers. In case of multiple PCCCHs, the blocks used according to the BS_PBCCH_BLKS parameter for PBCCH on the shared PBCCH/PCCCE time slot are not used for other PCCCHs in additional PCCCH time slots. These blocks can only be used in addition for packet data traffic channels (PDTCH). Thereby, the mobile terminals are always able to receive the PBCCH and the paging block also in a multiple PCCCH case, without the risk of loosing either PBCCH information or a paging message

SUMMARY OF THE INVENTION

It is an object of the invention to enable in a radio cell of a cellular communication network the transmission of MBMS data from a radio access network, in particular from a GERAN, to mobile terminals.

This object is reached according to the invention with a method comprising transmitting paging messages in at least one common control channel defined in a frame structures employed in the radio cell and transmitting the MBMS data in a dedicated channel defined equally in this frame structure. It is further proposed that this dedicated channel is allocated such that the mobile terminals are able to receive paging messages and the MBMS data simultaneously. This implies in particular that the multislot class constraints of the mobile terminals which are to receive the MBMS data are taken into account.

The object of the invention is equally reached with a network entity comprising means for transmitting corresponding signals, with a mobile terminal comprising means for receiving corresponding signals, and with a cellular communication system comprising such a network entity and such a mobile terminal.

The network entity according to the invention thus comprises means for transmitting via a radio interface paging messages on a common control channel, and for transmitting via the radio interface data for a multimedia broadcast/multicast service (MBMS) on a dedicated channel, wherein the paging messages and the MBMS data are transmitted such that they can be received simultaneously by mobile stations which are capable of receiving MBMS data and which are located in a radio cell supplied by the network entity. The network entity can be in particular a GERAN or a network element of a GERAN. The mobile terminal according to the invention comprises accordingly means for receiving via a radio interface simultaneously paging messages transmitted by the radio access network on a common control channel and data for a multimedia broadcast/multicast service (MBMS) transmitted by a radio access network of a cellular communication network on a dedicated channel.

The invention proceeds from the consideration that a transport mechanism for MBMS data has to take into account several restrictions. It has to be guaranteed in particular that the mobile terminals can receive paging messages while listening to an MBMS channel. Further, signaling and uplink message transfer should be avoided to allow a service support for large groups of people simultaneously. Also, unnecessary monitoring of downlink channels should be avoided in order to save the battery.

It is an advantage of the invention that it allows to fulfill all the mentioned criteria. Further, it allow a flexible resource allocation for multimedia broadcast and multicast services by enabling to adjust the channel bit rate based on the service requirements.

Preferred embodiments of the invention become apparent from the dependent claims.

There are a variety of approaches for allocated the dedicated channel such that the mobile terminals are capable of receiving paging messages and the MBMS data simultaneously.

A first approach is based on the assumption that each frame of the employed frame structure is composed of a plurality of time slots. It is proposed that the dedicated MBMS channel is placed on the carrier of a common control channel providing paging messages or, in case of frequency hopping, on a channel with the same hopping parameters as employed for this common control channel. The dedicated channel is moreover allocated to the time slots depending on the multislot class constraints of the mobile terminals. If the dedicated channel is allocated to the same time slot as the common control channel, any mobile terminal is able to listen to MBMS data and paging messages simultaneously. In case the mobile terminals are able to listen to at least two time slots simultaneously, the dedicated channel can also be allocated to a time slot adjacent to the time slot employed by the common control channel providing paging messages. In case the mobile terminals support reception of more than two time slots of downlink transmissions from the radio access network, the time slot employed for the dedicated channel does not even have to be immediately adjacent to the time slot employed for the common control channel providing paging messages. In general terms, the number of time slots between the time slot employed for the dedicated channel and the time slot employed for the common control channel providing paging messages may be at the most equal to the number of time slots supported by the mobile terminals minus two. In case the mobile terminals support for example three time slots, there may be thus one time slot between the time slot employed for the dedicated channel and the time slot employed for the common control channel providing paging messages.

In order to enable mobile terminals in addition to receive broadcast information at least without significant interruptions in the reception of MBMS data, additional care has to be taken how the MBMS channel is allocated in relation to a broadcast control channel transmitting the broadcast information. In a preferred alternative, the dedicated MBMS channel is allocated to a time slot which is employed in the radio cell as well for a broadcast control channel. In a second proposed alternative, the dedicated MBMS channel is allocated to a time slot which is adjacent to a time slot employed in the radio cell for a broadcast control channel. In a third proposed alternative, the dedicated MBMS channel is allocated to a time slot which is adjacent to a time slot employed for a common control channel providing paging messages, which common control channel time slot is in turn adjacent to a time slot employed in the radio cell for a broadcast control channel. Depending on the number of time slots of which the mobile terminals support reception, there might also be one or more time slots between the time slots employed for broadcast control channel, dedicated MBMS channel and common control channel, without preventing the mobile terminals from listening to all three time slots employed for these channels simultaneously.

Four alternative approaches are proposed in particular for the case that the dedicated channel is to be placed in such a way that a mobile terminal is not able to listen simultaneously to the dedicated channel and to the common control channel providing paging messages for the mobile terminal. The dedicated channel may have to be placed for example on another carrier than the common control channel providing paging messages, or to use another hopping frequency than this common control channel. In this case, there is a danger that some MBMS data is lost while the mobile terminal listens to the paging messages of its paging group.

The second approach is based on the assumption that the frame structure employed in the radio cell is divided into blocks, each comprising a plurality of frames. It is proposed that MBMS data is transmitted on different block periods than paging messages. In this case, the required guard time should be taken into account. The allocation according to the second approach is suited mainly for MBMS requiring reasonably small bit rates. It has further to be taken into account that paging messages may be provided for different paging groups by different common control channels and that thus different mobile terminals may listen to paging messages in different times.

In the third approach, which may be combined with the second approach, the mobile terminal is allowed to lose some MBMS data while listening to paging messages on the common control channel, in order to ensure that the mobile terminal can be reached by paging messages. Lost MBMS data can be received later on by repetition.

In the fourth approach, the paging messages for mobile terminals that are registered to receive MBMS data are transmitted also on the dedicated channel. Thus, the paging messages can be monitored simultaneously with the dedicated channel.

In the fifth approach, a mobile terminal is only notified via the dedicated channel that a paging message is coming. A mobile terminal may register to the network prior to beginning to listen to an MBMS. In case a paging message is coming for a mobile terminal that has registered for an MBMS, a corresponding indication is sent on the dedicated channel employed for transmitting the MBMS data. Such an indication requires less capacity than the paging message itself. Whenever, a mobile terminal receives this indication, it will change to the common control channel providing the announced paging message and listen to the paging message. Thereby, the mobile terminal will receive the paging message, even though it is primarily listening to the dedicated channel. The benefit of this approach is that it leaves more freedom for the allocation of the dedicated channel, while preserving the ability of the mobile terminal to receive paging messages in the conventional way. The mobile terminal will lose MBMS data only when a paging message arrives, which will occur much less frequently than the paging occasions on a common control channel Since the actual paging messages are sent on the normal paging channel, potential error cases that might result when transmitting the paging message on the dedicated MBMS channel can be avoided.

The invention can be employed in particular, though not exclusively, with GERAN.

In case of GERAN and packet switched MBMS data, the common control channel comprising paging messages is preferably the PCCCH defined for GPRS and EGPRS, and the broadcast control channel is preferably the PBCCH defined for GPRS and EGPRS.

BRIEF DESCRIPTION OF THE FIGURES

Other objects and features of the present invention will become apparent from the following detailed description considered in conjunction with the accompanying drawings, of which.

DETAILED DESCRIPTION OF THE INVENTION

Four embodiments of the preferred first approach of the invention will be presented. Each of the embodiments is realized in a GERAN cell using GPRS or EGPRS. In each of the embodiments, a dedicated channel is provided for the transmission of MBMS data from a GERAN to mobile terminals located in the GERAN cell. The dedicated channel will be referred to as Packet Multimedia Broadcast Channel (PMBCH).

A first and a second embodiment of the invention are intended for the case that a single PCCCH is allocated in a GERAN cell. In this case, PCCCH and PBCCH are placed on the same physical channel, which physical channel is defined by time slot and frequency. The PCCCH is employed in the GERAN cell also for providing paging messages to mobile terminals.

Figure 1:
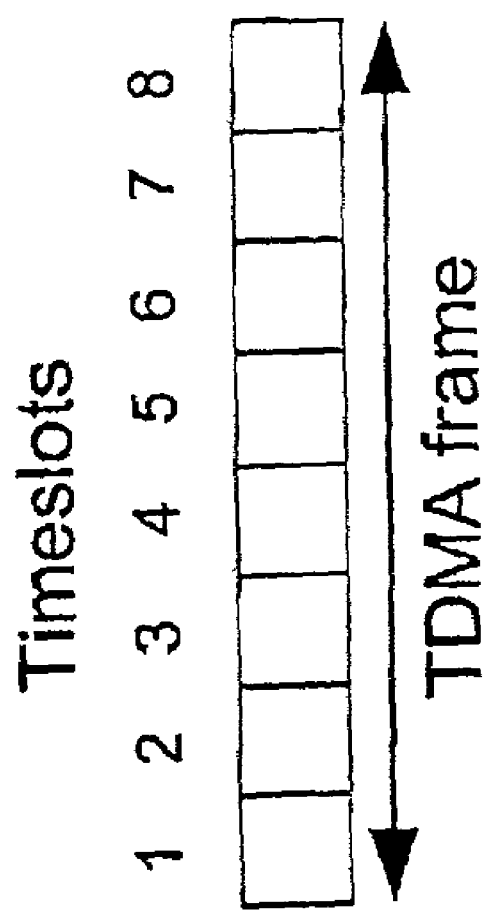
FIG. 1 presents a TDMA frame structure.
Figure 2:
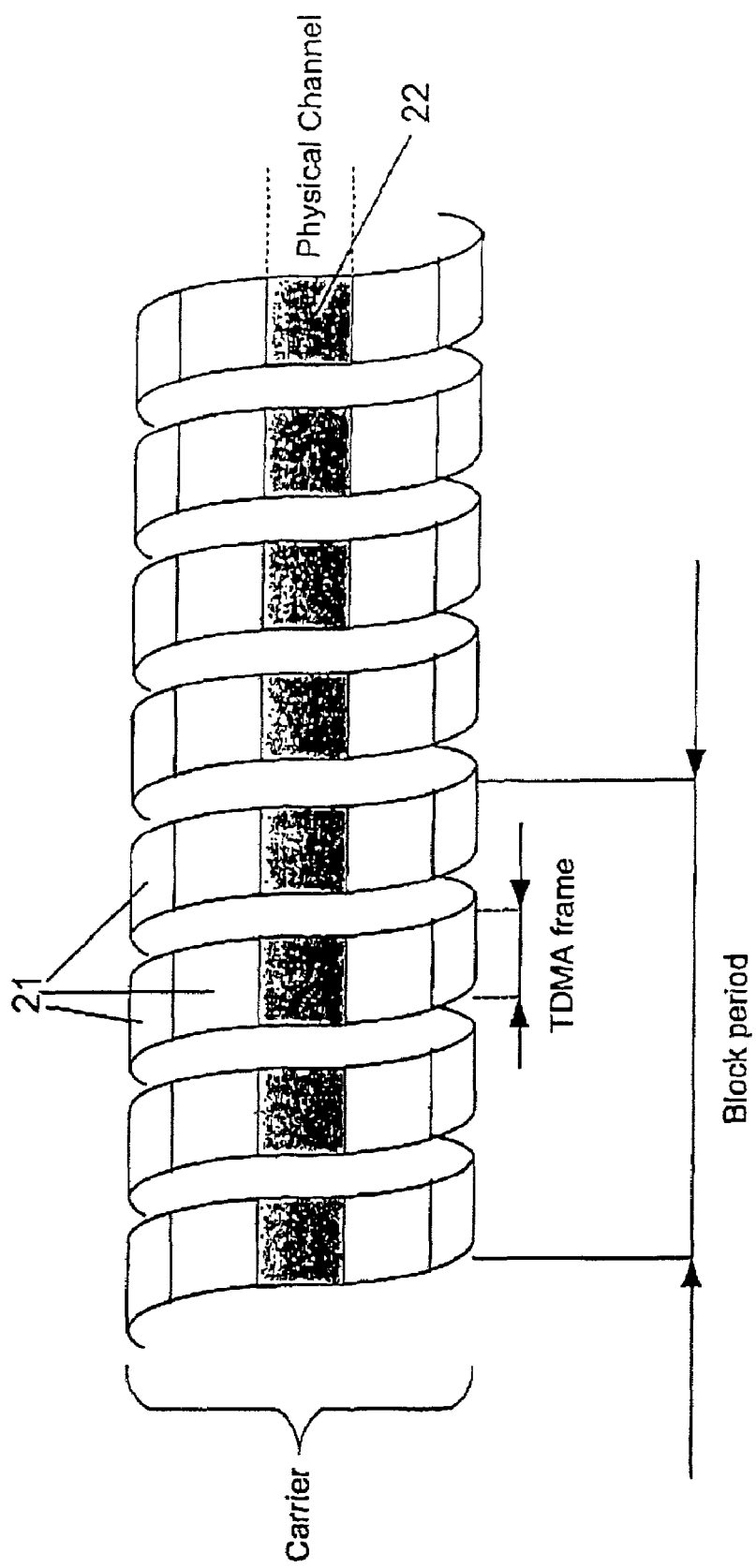
FIG. 2 illustrates the composition of a physical channel in a TDMA frame structure.
Figure 3:
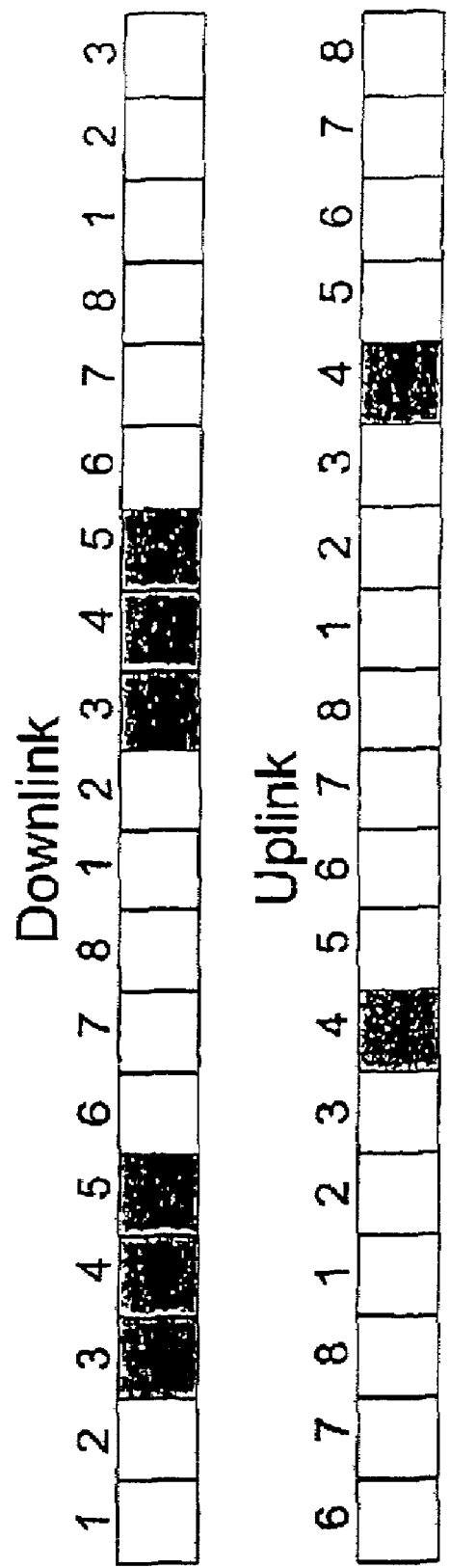
FIG. 3 shows by way of example downlink and uplink timeslots used by a class 4 mobile terminal.
Figure 4:
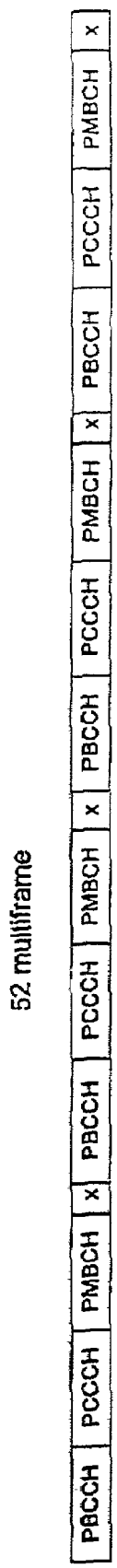
FIG. 4 illustrates a first embodiment of the invention.

In the first presented embodiment, the new PMBCH is allocated in addition to the same physical channel as the PBCCH and the PCCCH. This approach is illustrated in FIG. 4. FIG. 4 presents the time slot used for the physical channel in subsequent frames of a 52 multiframe.

Four consecutive frames belong to a respective block. The physical channel is divided between PBCCH, PCCCH and PMBCH on a block by block basis, each of these channels being allocated to the time slot at different block periods. The corresponding time slot in the frame x is referred as idle frame. In principle, it is also possible to allocate normal PDCHs to this physical channel. It has to be taken into account, however, that the available remaining capacity is quite small.

The assignment of PCCCH, PBCCH and PMBCH to the same time slot guarantees that the mobile terminals in the cell are able to receive MBMS data without losing paging or broadcast messages, since only a single time slot has to be monitored in order to obtain the entire information.

The presented first embodiment of the invention is only appropriate, though, in case a rather small bit rate is required by the MBMS, since the available capacity on the time slot of the employed physical channel is limited.

The second embodiment is proposed as an alternative for the case that more capacity is needed for the MBMS. In this embodiment, MBMS data is allocated to time slots that are adjacent to the time slot employed for the PBCCH and the PCCCH.

Figure 5:
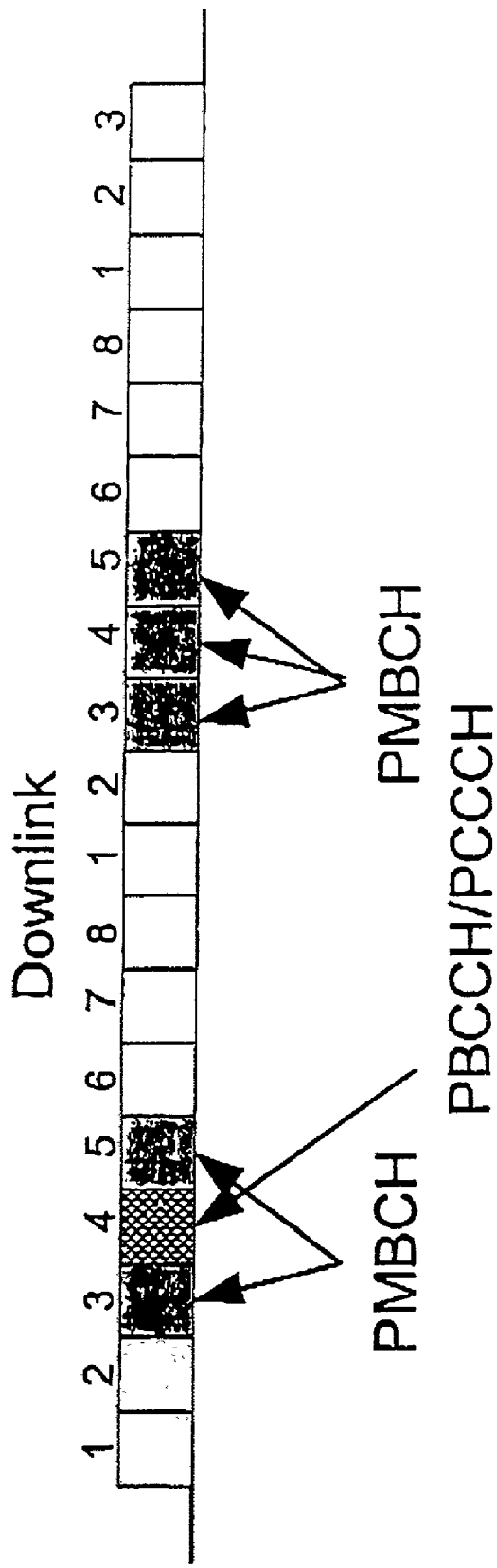
FIG. 5 illustrates a second embodiment of the invention.

A possible allocation of channels according to the second presented embodiment is illustrated in FIG. 5. For the presented example, it is assumed that the mobile terminals in the cell which support MBMS reception are able to receive in 3 time slots. Such mobile terminals may be for instance class 4 mobile terminals.

FIG. 5 shows a sequence of downlink time slots, which are numbered for each frame from 1 to 8. The only PCCCH and the PBCCH are allocated to time slot 4. The new PMBCH is allocated to the adjacent time slots 3 and 5. Since the PCCCH and the PBCCH require only part of the time slot capacity of time slot 4, the PMBCH can be allocated in addition to the remaining capacity of time slot 4. In FIG. 5, time slot 4 of the first depicted frame is assigned to the PCCCH and/or the PBCCH, while time slots 3 and 5 are assigned to the PMBCH. In the second depicted frame, in contrast, time slot 4 is assigned to the PMBCH in addition to time slots 3 and 5. Depending on the required capacity, the PMBCH may occur in every block on the selected time slots or less often.

It has to be noted that the total number of allocated time slots should not exceed the number of time slots that are supported by the MBMS capable mobile terminals for which the MBMS data is intended. This guarantees that the class limitations of the mobile terminals do not prevent reception of the MBMS data in addition to paging and broadcast messages.

A third and a fourth embodiment of the invention are intended for the case that more than one PCCCH is allocated in a GERAN cell. In this case, each mobile terminal has to follow only the PCCCH where its paging group is located. The first one of the PCCCHs is allocated to the same time slot as the PBCCH. Also in the third and fourth embodiment, the PMBCH is allocated either to the same time slot as the PCCCH which the mobile terminals are following, and/or to time slots adjacent to the time slot to which this PCCCH is allocated. Since different mobile terminals might follow different PCCCHs, the PMBCH and all of the PCCCH channels of the cell should be allocated on adjacent time slots, in order to allow all mobile terminals of the cell to follow their paging groups and the PMBCH. In case the PMBCH is not allocated to the same time slot as one of the PCCCHs providing the paging messages, it may be allocated to the same time slot as another PCCCH and/or to time slots to which no PCCCH is allocated.

The third embodiment of the invention is presented for a constellation in which the cell employs two PCCCH time slots and in which the mobile terminals of the cell capable of receiving MBMS are able to receive on three time slots. In order to enable the mobile terminals to receive the PBCCH and the paging blocks on the PCCCH without MBMS service interruptions, the PBCCH, the PCCCH providing the paging messages and the PMBCH are allocated to adjacent time slots. Thus, in case the PBCCH and the PCCCH providing the paging messages are allocated to the same time slot, at least two adjacent time slots are employed, while in case the PBCCH and the PCCCH providing the paging messages are allocated to different time slots, three adjacent time slots are employed.

The fourth embodiment of the invention is presented for a constellation in which the cell employs two PCCCH time slots, but in which at least some mobile terminals in the cell capable of receiving MBMS are only able to receive on two time slots. In this case, the two PCCCH time slots are advantageously allocated one time slot apart from each other, and the PMBCH is allocated to the time slot between the two PCCCH time slots.

Figure 6:
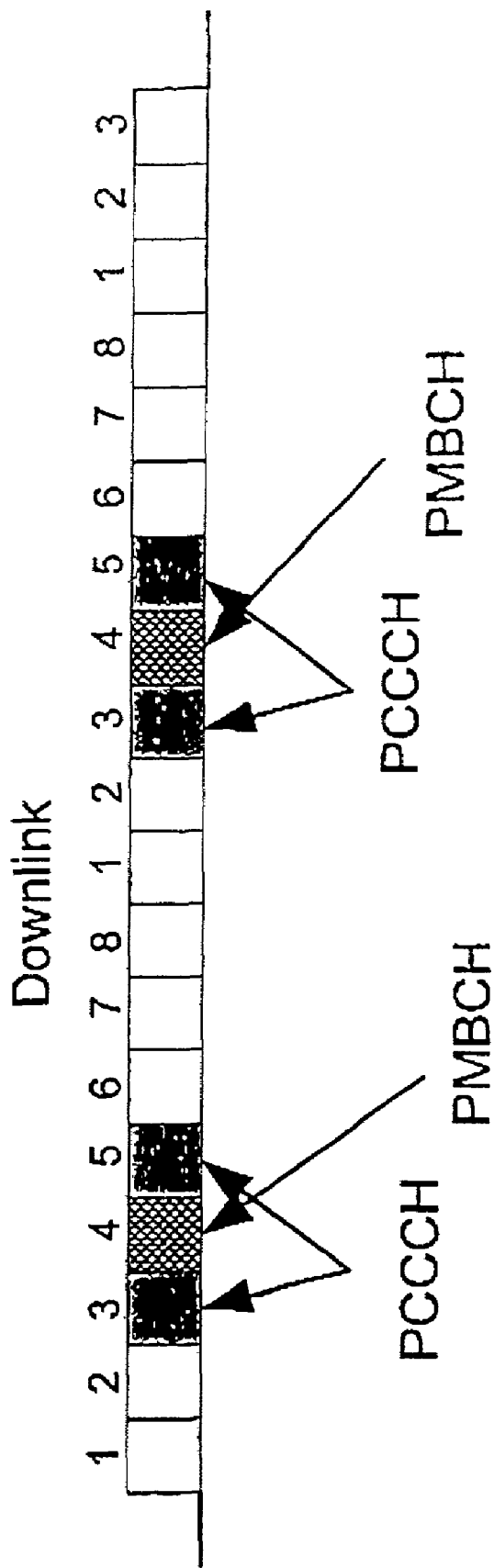
FIG. 6 illustrates a fourth embodiment of the invention.

An example for the allocation of channels according to the fourth embodiment of the invention is depicted in FIG. 6. FIG. 6 shows again a sequence of downlink time slots, which are numbered for each frame from 1 to 8. A first PCCCH time slot 3, which corresponds always to the PBCCH time slot, is spaced one time slot apart from a second PCCCH time slot 5. The PMBCH is allocated to the time slot that is located between the two PCCCH time slots 3 and 5, i.e. on time slot 4. The paging messages for a specific mobile terminal are provided by either of the two PCCCHs.

With such an allocation, all mobile terminals in the GERAN cell which are capable of listening to at least two downlink time slot are able to decode paging messages and the MBMS data. Mobile terminals following the first PCCCH time slot 3, which contains also the PBCCH blocks, can receive with the presented allocation the PBCCH, the PCCCH providing the paging messages and the PMBCH without interruptions. Mobile terminals following the second PCCCE time slot 5 can receive the paging messages provided by the second PCCCH normally, but they have to quit reception on the PMBCH time slot 4 from time to time for a short period, when decoding system information messages from the PBCCH provided on time slot 3.

Mobile terminals capable of receiving on three time slots are obviously able to receive MBMS data without interruptions also with the allocation of the fourth embodiment. With such mobile terminals, the fourth embodiment constitutes a special case of the third embodiment.

The four presented embodiments of the invention have the advantage that the GERAN paging concept does not have to be modified, since the mobile terminals are enabled to listen to the paging blocks allocated to their respective paging group.

While there have shown and described and pointed out fundamental novel features of the invention as applied to preferred embodiments thereof, it will be understood that various changes in the details of the devices and methods described may be made by those skilled in the art without departing from the spirit of the invention. It is the intention, therefore, to be limited only as indicated by the scope of the claims appended hereto.

The invention claimed is:

1. Method comprising
transmitting paging messages in at least one common control channel defined in a frame structure employed in a radio cell, wherein in said frame structure each frame is composed of a plurality of time slots;
transmitting data for a multimedia broadcast/multicast service in a dedicated channel, separate from the common control channel and defined in said frame structure, wherein said dedicated channel is allocated such that mobile terminals located in said radio cell are capable of receiving paging messages and said multimedia broadcast/multicast service data simultaneously via a radio interface; and
allocating a broadcast control channel employed in said radio cell, and said common control channel comprising paging messages, to a same time slot in different frames or within a single frame.

2. Method according to claim 1, wherein said dedicated channel is allocated at least to said time slot employed in said radio cell for said common control channel comprising paging messages, and wherein said dedicated channel is placed on a carrier employed in said radio cell for said common control channel comprising paging messages.

3. Method according to claim 1, wherein said dedicated channel is allocated at least to said time slot employed in said radio cell for said common control channel comprising paging messages and for said broadcast control channel, and wherein said dedicated channel is placed on a carrier employed in said radio cell for said common control channel comprising paging messages and for said broadcast control channel.

4. Method according to claim 1, wherein said dedicated channel is allocated at least to said time slot employed in said radio cell for said common control channel comprising paging messages, and wherein said dedicated channel is placed on a channel with the same frequency hopping parameters as used in said radio cell for said common control channel comprising paging messages.

5. Method according to claim 1, wherein said dedicated channel is allocated at least to said time slot employed in said radio cell for said common control channel comprising paging messages and for said broadcast control channel, and wherein said dedicated channel is placed on a channel with the same frequency hopping parameters as used in said radio cell for said common control channel comprising paging messages and for said broadcast control channel.

6. Method according to claim 1, wherein said dedicated channel is placed on a carrier employed in said radio cell for said common control channel comprising paging messages, and wherein the number of time slots in a sequence of consecutive time slots, comprising a time slot associated to said common control channel employed for transmitting paging messages and a time slot associated to said dedicated channel is at the most equal to the number of time slots of which reception is supported by said mobile terminals for downlink transmissions from said radio access network.

7. Method according to claim 1, wherein said dedicated channel is allocated at least to a time slot adjacent to a time slot employed in said radio cell for said common control channel comprising paging messages.

8. Method according to claim 1, wherein said dedicated channel and all common control channels employed in said radio cell are allocated to adjacent time slots.

9. Method according to claim 1, wherein the number of time slots to which common control channels and said dedicated multimedia broadcast/multicast service channel are allocated in said radio cell is at the most equal to the number of time slots supported by the mobile terminals in said cell for reception of downlink transmissions from said radio access network to said mobile terminals.

10. Method according to claim 1, wherein said dedicated channel is allocated in addition to at least one time slot to which a common control channel is allocated in said radio cell, during periods in which said at least one time slot is not required for said common control channel.

11. Method according to claim 1, wherein said dedicated channel is placed on a channel with the same frequency hopping parameters as used in said radio cell for said common control channel comprising paging messages, and wherein the number of time slots in a sequence of consecutive time slots comprising a time slot associated to said common control channel employed for transmitting paging messages and a time slot associated to said dedicated channel is at the most equal to the number of time slots of which reception is supported by said mobile terminals for downlink transmissions from said radio access network.

12. Method according to claim 1, wherein in said frame structure predetermined numbers of frames constitute a respective block, wherein said multimedia broadcast/multicast service data is transmitted on said dedicated channel in blocks which are different from blocks in which paging messages are transmitted on said common control channel.

13. Method according to claim 1, wherein multimedia broadcast/multicast service data transmitted on said dedicated channel is allowed to be lost during transmission in said radio cell and to be received later on by said mobile terminals during a repetition of the transmission of said multimedia broadcast/multicast service data on said dedicated channel.

14. Method according to claim 1, wherein said paging messages are transmitted in addition on said dedicated channel.

15. Method according to claim 1, wherein in case a paging message will be provided on said common control channel, an information that a paging message will be provided is transmitted in addition on said dedicated channel.

16. Apparatus comprising a transmitting component
configured to transmit via a radio interface paging messages on a common control channel defined in a frame structure, wherein in said frame structure each frame is composed of a plurality of time slots, and
configured to transmit via said radio interface data for a multimedia broadcast/multicast service on a dedicated channel, separate from the common control channel and defined in said frame structure, wherein said paging messages and said multimedia broadcast/multicast service data are transmitted such that they can be received simultaneously by mobile stations which are capable of receiving multimedia broadcast/multicast service data and which are located in a radio cell supplied by said network entity; and
configured to allocate a broadcast control channel employed in said radio cell, and said common control channel comprising paging messages, to a same time slot in different frames or within a single frame.

17. Apparatus according to claim 16, wherein said transmitting component is configured to allocate a dedicated channel at least to said time slot employed in said radio cell for said common control channel comprising paging messages, and to place said dedicated channel on a carrier employed in said radio cell for said common control channel comprising paging messages.

18. Apparatus according to claim 16, wherein said transmitting component is configured to allocate said dedicated channel at least to a time slot employed in said radio cell for said common control channel comprising paging messages and for said broadcast control channel employed in said radio cell, and to place said dedicated channel on a carrier employed in said radio cell for said common control channel comprising paging messages and for said broadcast control channel.

19. Apparatus according to claim 16, wherein said transmitting component is configured to allocate said dedicated channel at least to said time slot employed in said radio cell for said common control channel comprising paging messages, and to place said dedicated channel on a channel with the same frequency hopping parameters as used in said radio cell for said common control channel comprising paging messages.

20. Apparatus according to claim 16, wherein said transmitting component is configured to allocate said dedicated channel at least to said time slot employed in said radio cell for said common control channel comprising paging messages and for said broadcast control channel employed in said radio cell, and to place said dedicated channel on a channel with the same frequency hopping parameters as used in said radio cell for said common control channel comprising paging messages and for said broadcast control channel.

21. Apparatus according to claim 16, wherein said dedicated channel is placed on a carrier employed in said radio cell for said common control channel comprising paging messages, and wherein the number of time slots in a sequence of consecutive time slots comprising a time slot associated to said common control channel employed for transmitting paging messages and a time slot associated to said dedicated channel is at the most equal to the number of time slots of which reception is supported by said mobile terminals for downlink transmissions from said radio access network.

22. Apparatus according to claim 16, wherein said transmitting component is configured to allocate said dedicated channel at least to a time slot adjacent to said time slot employed in said radio cell for said common control channel comprising paging messages.

23. Apparatus according to claim 16, wherein said transmitting component is configured to allocate said dedicated channel and all common control channels employed in said radio cell to adjacent time slots.

24. Apparatus according to claim 16, wherein the number of time slots to which common control channels and said dedicated multimedia broadcast/multicast service channel are allocated in said radio cell is at the most equal to the number of time slots supported by the mobile terminals in said cell for reception of downlink transmissions from said radio access network to said mobile terminals.

25. Apparatus according to claim 16, wherein said transmitting component is configured to allocate said dedicated channel in addition to at least one time slot to which a common control channel is allocated in said radio cell, during periods in which said at least one time slot is not required for said common control channel.

26. Apparatus according to claim 16, wherein said transmitting component is configured to place said dedicated channel on a channel with the same frequency hopping parameters as used in said radio cell for said common control channel comprising paging messages, and wherein the number of time slots in a sequence of consecutive time slots comprising a time slot associated to said common control channel employed for transmitting paging messages and a time slot associated to said dedicated channel is at the most equal to the number of time slots of which reception is supported by said mobile terminals for downlink transmissions from said radio access network.

27. Apparatus according to claim 16, wherein in said frame structure predetermined numbers of frames constitute a respective block, and wherein said transmitting component is configured to transmit said multimedia broadcast/multicast service data on said dedicated channel in blocks which are different from blocks in which paging messages are transmitted on said common control channel.

28. Apparatus according to claim 16, wherein multimedia broadcast/multicast service data transmitted on said dedicated channel is allowed to be lost during transmission in said radio cell and to be received later on by said mobile terminals during a repetition of the transmission of said multimedia broadcast/multicast service data on said dedicated channel.

29. Apparatus according to claim 16, wherein said transmitting component is configured to transmit said paging messages in addition on said dedicated channel.

30. Apparatus according to claim 16, wherein said transmitting component is configured to transmit an information that a paging message will be provided in addition on said dedicated channel, in case a paging message will be provided on said common control channel.

31. Apparatus according to claim 16, wherein said apparatus is a network element.

32. Network entity comprising an apparatus according to claim 16.

33. Apparatus comprising a receiving component configured to receive via a radio interface simultaneously paging messages transmitted by a radio access network on a common control channel defined in a frame structure and data for a multimedia broadcast/multicast service transmitted by a radio access network of a cellular communication network on a dedicated channel, separate from the common control channel and defined in said frame structure, configured to support reception of downlink transmissions from said radio access network on at least one time slot, and configured to monitor on said at least one time slot, reception of a broadcast control channel and of said common control channel comprising paging messages, said broadcast control channel and said common control channel being allocated to a same time slot in different frames or within a single frame.

34. Apparatus according to claim 33, wherein said receiving component is configured to support reception of downlink transmissions from said radio access network on at least two time slots, and to monitor two adjacent time slots to which said common control channel comprising paging messages and said dedicated channel are allocated.

35. Apparatus according to claim 33, wherein multimedia broadcast/multicast service data transmitted on said dedicated channel is allowed to be lost during transmission in said radio cell and to be received later on by said mobile terminals during a repetition of the transmission of said multimedia broadcast/multicast service data on said dedicated channel.

36. Apparatus according to claim 33, wherein said apparatus is a mobile terminal.

37. Communication system comprising
a network entity of a cellular communication network with a transmitting component configured to transmit via a radio interface paging messages on a common control channel defined in a frame structure, wherein in said frame structure each frame is composed of a plurality of time slots, configured to transmit via said radio interface data for a multimedia broadcast/multicast service on a dedicated channel, separate from the common control channel and defined in said frame structure, wherein said paging messages and said multimedia broadcast/multicast service data are transmitted such that they can be received simultaneously by mobile stations which are capable of receiving multimedia broadcast/multicast service data and which are located in a radio cell supplied by said network entity, and configured to allocate a broadcast control channel employed in said radio cell, and said common control channel comprising paging messages, to a same time slot in different frames or within a single frame; and
a mobile terminal with a receiving component configured to receive via a radio interface simultaneously paging messages transmitted by said radio access network on a common control channel and data for a multimedia broadcast/multicast service transmitted by a radio access network on a dedicated channel.

38. Apparatus comprising
means for transmitting via a radio interface paging messages on a common control channel defined in a frame structure, wherein in said frame structure each frame is composed of a plurality of time slots,
means for transmitting via said radio interface data for a multimedia broadcast/multicast service on a dedicated channel, separate from the common control channel and defined in said frame structure, wherein said paging messages and said multimedia broadcast/multicast service data are transmitted such that they can be received simultaneously by mobile stations which are capable of receiving multimedia broadcast/multicast service data and which are located in a radio cell supplied by said network entity, and means for allocating a broadcast control channel employed in said radio cell, and said common control channel comprising paging messages, to a same time slot in different frames or within a single frame.

39. Apparatus comprising means for receiving via a radio interface simultaneously paging messages transmitted by a radio access network on a common control channel defined in a frame structure and data for a multimedia broadcast/multicast service transmitted by a radio access network on a dedicated channel, separate from the common control channel and defined in said frame structure, wherein in said frame structure each frame is composed of a plurality of time slots; and means for monitoring on at least one time slot reception of a broadcast control channel and of a common control channel comprising paging messages, said broadcast control channel and said common control channel being allocated to a same time slot in different frames or within a single frame.

40. Method according to claim 39 comprising:

monitoring at least two adjacent time slots to which said common control channel comprising paging messages and said dedicated channel are allocated.

41. Method comprising at a mobile terminal:

receiving via a radio interface simultaneously paging messages transmitted by a radio access network on a common control channel defined in a frame structure and data for a multimedia broadcast/multicast service transmitted by a radio access network on a dedicated channel, separate from the common control channel and defined in said frame structure, wherein in said frame structure each frame is composed of a plurality of time slots; and monitoring on at least one time slot reception of a broadcast control channel and of a common control channel comprising paging messages, said broadcast control channel and said common control channel being allocated to a same time slot in different frames or within a single frame.

\* \* \* \* \*